United States Patent [19]

Mylius et al.

[11] Patent Number: 4,480,531

[45] Date of Patent: Nov. 6, 1984

[54] MECHANICAL QUICK-RELEASE MECHANISM FOR SPRING-LOADED BRAKE CYLINDERS

[75] Inventors: Horst Mylius, Garbsen; Josef Frania, Hanover; Mom ilo Risti , Garbsen, all of Fed. Rep. of Germany

[73] Assignee: Wabco Fahrzeugbremsen GmbH, Hanover, Fed. Rep. of Germany

[21] Appl. No.: 322,826

[22] Filed: Nov. 19, 1981

[30] Foreign Application Priority Data

Dec. 11, 1980 [DE] Fed. Rep. of Germany ....... 3046669

[51] Int. Cl.³ .............................................. F01B 9/00
[52] U.S. Cl. ...................................... 92/29; 92/85 R; 92/129; 92/130 A
[58] Field of Search .................. 92/29, 63, 130 A, 33, 92/23, 129, 85 R; 188/170

[56] References Cited

U.S. PATENT DOCUMENTS

| | | | |
|---|---|---|---|
| 2,686,528 | 8/1954 | Snyder | 92/23 |
| 3,498,188 | 3/1970 | Rodriguez | 92/29 |
| 3,704,653 | 12/1972 | Higgins | 92/29 |
| 3,994,205 | 11/1976 | Ekdahl | 92/29 |
| 4,080,875 | 3/1978 | Repolovsky | 92/29 |
| 4,080,876 | 3/1978 | Sturgess | 92/29 |
| 4,280,398 | 7/1981 | Kerscher | 92/29 |
| 4,364,305 | 12/1982 | Dalibout | 92/29 |

FOREIGN PATENT DOCUMENTS 2751607   5/1979   Fed. Rep. of Germany .......... 92/29

Primary Examiner—Abraham Hershkovitz
Attorney, Agent, or Firm—G. E. Hawranko

[57] ABSTRACT

A manually operable quick-release mechanism for use with a spring-loaded brake cylinder including an energy-storing piston operable by fluid pressure to a brake release position with a ball type clutch for locking said piston and a piston rod in said brake release position, and a manually rotatable member effective, when angularly displaced, for releasing the ball clutch and the piston and allowing the piston and piston rod to move to a brake-applying position.

7 Claims, 8 Drawing Figures

MECHANICAL QUICK-RELEASE MECHANISM FOR SPRING-LOADED BRAKE CYLINDERS

BACKGROUND OF THE INVENTION

Mechanical release devices of this type are presently known. They operate to release, through mechanical tension of a spring, the brakes which are in an applied position when the spring tension is released.

The use of this type of release mechanism is limited, however, to spring-loaded brake cylinders in which the transfer of the braking force to the wheel brakes or to their levers, respectively, is triggered by a pulling motion through the tension of the spring by means of a Bowden cable. For applications of spring-loaded brake cylinders where it is necessary that the braking force be triggered with a pushing motion, the transfer of the motion to the wheel brakes cannot be executed via Bowden cable. This is especially not possible in cases when the spring-loaded braking cylinder assigned to an auxiliary brake cycle is located in a common housing with the brake cylinder assigned to a service brake cycle, and the actuation of the transfer mechanism, which acts upon the wheel brakes, is triggered by a common piston rod. If actuation of the brake is being transferred by means of Bowden cables from a spring-loaded brake cylinder to both wheel brakes of a vehicle axle, then much force is required to transfer the release function of the quick-release mechanism to both wheel brakes simultaneously.

SUMMARY OF THE INVENTION

The object of the present invention, therefore, is to provide a manually operable quick-release mechanism for spring-loaded brake cylinders of the type above mentioned, and applicable to all the conditions described. At the same time the manual actuation of the release mechanism, which includes a manually rotatable member, should be easily accessible from the outside and the angle of rotation relatively small.

Among others, the invention has the advantage that the same release device, which is executed with a small amount of manual rotation of the rotatable member, is adaptable for use in all of the mentioned applications of the spring-loaded brake cylinder. In addition to this, the size of the cylinder is held to a minimum.

DESCRIPTION AND OPERATION

Figure 1:
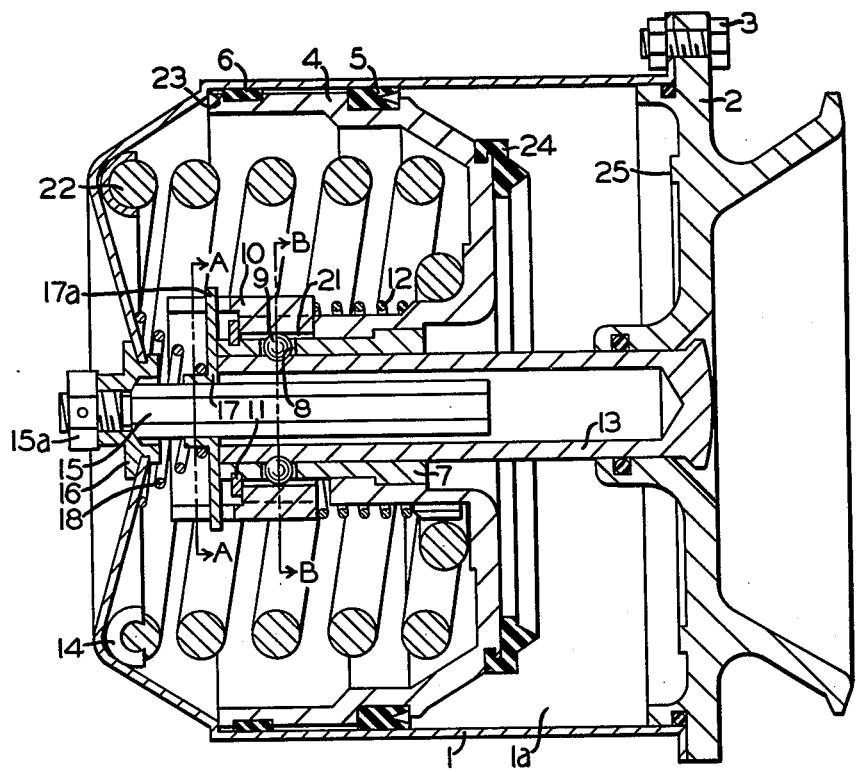
FIG. 1 is an elevational view, in section, of a spring-loaded brake cylinder in a compressed state and embodying the invention.

As shown in FIG. 1, a spring-loaded brake cylinder is comprised of a cylinder 1 having attached thereto a flange 2 with bolts 3. Operably disposed within the cylinder 1 is a piston 4 with a sealing ring 5, a guide ring 6, a bushing 7 with bores 8, steel balls 9, a clutch ring 10, a retaining ring 11, a torsion spring 12 and a piston rod 13.

Figure 1A:
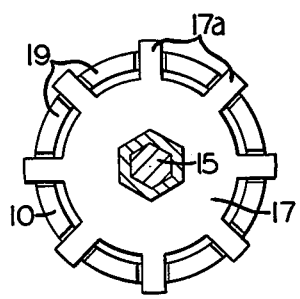
FIG. 1A is a sectional view taken along line A—A of FIG. 1.
Figure 1C:
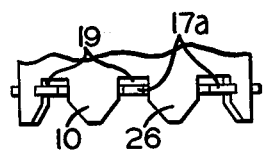
FIG. 1C is a side view, in outline, of the portion shown in FIG. 1A.

In a bottom portion 14 of the cylinder 1, a rotatable shaft 15 is arranged in a socket 16 which is fixed to the bottom 14. The end of shaft 15 extending into the cylinder 1 has a hexagonal cross-sectional shape. An annular coupling plate 17 is axially slidably carried on the hexagonal shaft 15 and is urged axially rightwardly, as viewed in the drawing, on said shaft by a compression spring 18 compressed between coupling plate 17 and bottom portion 14. A plurality of teeth 17a are equiangularly spaced at the outer periphery of coupling plate 17 which engage in correspondingly axially formed grooves 19 of clutch ring 10. See FIGS. 1A and 1C. In addition, specially designed clearances or recesses 20 are provided in the clutch ring 10 as well. An annular tee-slot 21 is formed in piston rod 13.

A heavy duty spring 22, serving as an energy storage member, is compressible between the inner side of the piston head of piston 4 and the cylinder bottom 14. When a pressure chamber 1a is charged with fluid pressure and spring 22 is compressed, brake piston 4 occupies a brake release position in which it is shown and limited by engagement with a stop 23 comprising an annular peripheral shoulder of the cylinder bottom 14.

Figure 1B:
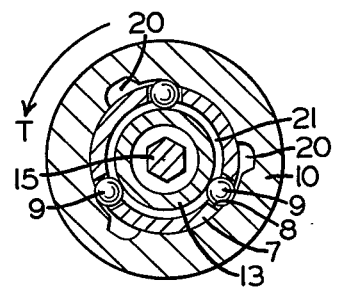
FIG. 1B is a sectional view taken along line B—B of FIG. 1.

When the pressure medium in chamber 1a is released, piston 4 is moved rightwardly, as viewed in the drawing, into a brake application position by the force of the storage spring 22. The force of the spring 22 is transferred to the piston rod 13 via the piston 4, the bushing 7, the clutch ring 10, the steel ball 9, and the annular tee-slot 21. Through the initially stressed torsion spring 12, the clutch ring 10 is always supplied with a certain torque in the direction of rotation indicated by the arrow T in FIG. 1B, and as a result holds clutch ring 10 within the locked position shown in FIG. 1B. In this position, all of the parts under the flux of force are coupled so as to be positively locked against movement.

Through rotation of the hexagonal shaft 15, the clutch ring 10, via the coupling plate 17 or its teeth 17a, respectively, is also locked against the initially tensioned torsion spring 12. At a certain angle of rotation of shaft 15 by turning an exterior end 15a, as by a wrench, for example, in a direction opposite to that of arrow T, the steel balls 9 have to move into the spaces 20, as a result of the forces acting upon them. The flux of force, from spring 22, to piston 4, and to piston rod 13 is interrupted. The piston 4, together with the clutch ring 10 and the balls 9, moves without the piston rod 13 under the force of the spring 22 until right-hand end 24 thereof contacts a stop 25 comprising an annular shoulder formed on flange 2. The piston rod 13 becomes practically powerless. The coupling 17 becomes disengaged from clutch ring 10 or its grooves 19, respectively, and is released from the piston rod 13 under the relatively light initial tension of the spring 18. But the force of spring 18 is being compensated for by the return springs in the brake or in the service brake portion, respectively. The brakes are thus released.

When chamber 1a is recharged with fluid pressure, the piston 4, in opposition to the force of spring 22, is moved back to its position against the cylinder stop 23. Coupling 17 or its teeth 17a, respectively, again engage in the spaces 19 of the clutch ring 10. Crosspieces 26 between the spaces 19 are rounded (see FIG. 1C), in order to ensure the proper sliding of the teeth 17a into the spaces 19. After the steel balls 9 on the piston rod 13 have returned to the position above the annular tee-slot 21, the clutch ring 10, as a result of rotation by the torsion spring 12, pushes the steel balls 9, across the slants of the space 20, back into the original locked position. Further rotation of the clutch ring 10 causes a positive locking at the same time. The spring-loaded mechanism is once again in the braking position.

Figure 2:
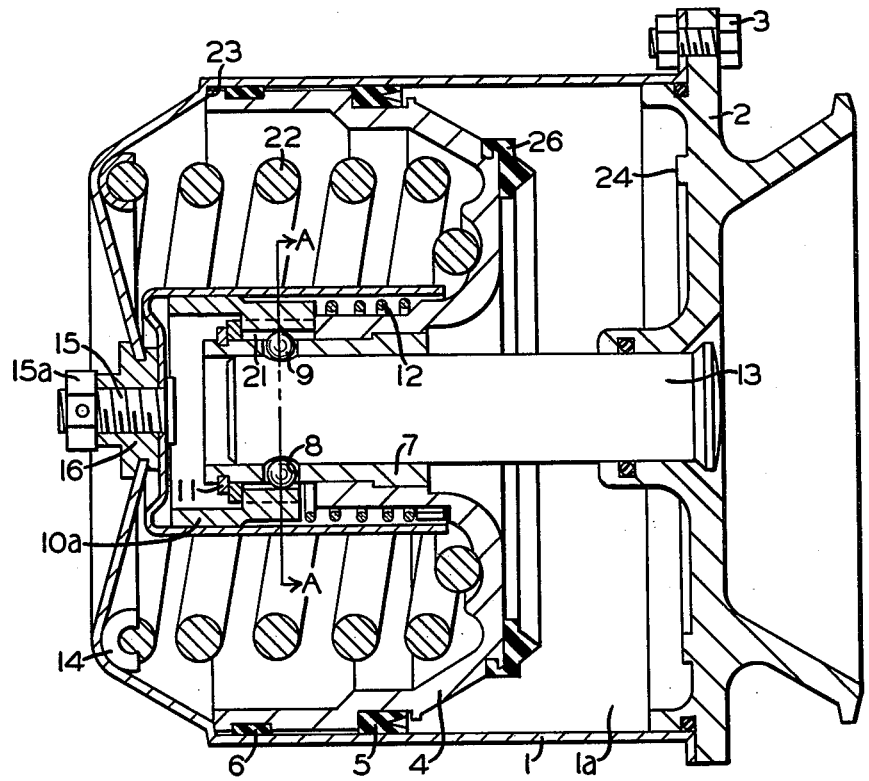
FIG. 2 is an elevational view, in section, of a modification of the spring-loaded brake cylinder with quick-release mechanism shown in FIG. 1.

The embodiment shown in FIG. 2 incorporates identical reference symbols for those components which correspond to the components as per FIG. 1. Different components carry new references.

Figure 2A:
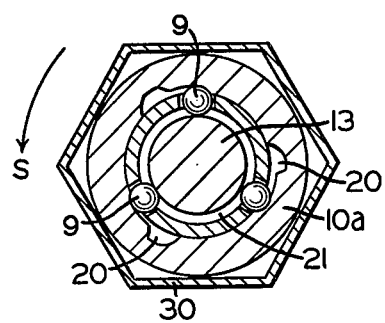
FIG. 2A is a sectional view taken along line A—A of FIG. 2.

The spring-loaded brake cylinder, as per FIG. 2, comprises the cylinder 1 which is connected to flange 2 by bolts 3. Installed into the cylinder 1 is the piston 4 with sealing ring 5, guide ring 6, bushing 7 having bores 8, steel balls 9, a clutch ring 10a, retaining ring 11, torsion spring 12 and piston rod 13. In the bottom 14 of cylinder 1, rotatable shaft 15 is arranged in socket 16 which is fixed to the bottom 14. The end of the shaft 15 extending into the cylinder 1 is fixed to a cup-shaped coupling 30. The coupling 30 is internally hexagonally-shaped so as to complementarily receive clutch ring 10a which at one part thereof is hexagonallyshaped. Similarly to clutch ring 10 shown in FIGS. 1 and 1B, clutch ring 10a is provided with specially shaped spaces or recesses 20 and an annular tee-slot 21 in the piston rod 13. The compression spring 22 acting as an energy storage member is compressedly disposed between the piston head of piston 4 and the cylinder bottom 14. When the brake is in the release position, piston 4, as a result of pressure supplied to chamber 1a, is moved from its application position to its release position in which it is shown in FIG. 2 and defined by engagement with stop 23 of casing 1. In normal operation, if pressure is released from chamber 1a, piston 4 is moved rightwardly by spring 22 to its brake application position by the force of storage spring 22. The force of spring 22 is transferred to piston rod 13 via piston 4, bushing 7, clutch ring 10a, steel balls 9 and annular tee-slot 21. With the initially tensioned torsion spring 12, the clutch ring 10a is always supplied with a certain torque in the direction of rotation indicated by arrow S in FIG. 2A, and as a result holds the clutch ring 10a in the locked position shown in FIG. 2A. In this position, all of the parts under the flux of force are positively locked together.

If it is desired to release the brakes manually, the end 15a of shaft 15 is rotated by a wrench, for example, and via the fixed coupling 30 the clutch ring 10a is also locked against the initially tensioned torsion spring 12. After a certain amount of rotation of shaft 15 in a direction opposite to that of arrow S, balls 9, as a result of the forces acting upon them, have to move into the spaces 20. The flux of force from spring 22 to piston 4, and to piston rod 13 is interrupted and the brake released. The piston 4 moves together with clutch ring 10a and balls 9, without piston rod 13, through the force of the spring 22 until it abuttingly contacts a stop 24 located on the flange 2. The piston rod 13 is rendered powerless. If fluid pressure is again supplied to chamber 1a, piston 4, against the opposition of spring 22, is moved back to its brake application position in abutting contact with cylinder stop 23. After the steel balls 9 have returned to the position above the annular tee-slot 21 on the piston rod 13, the clutch ring 10a, as a result of the rotation with torsion spring 12, pushes the steel balls 9 across the slant of the spaces 20 back into the original locked position. At the same time, the steel balls 9 are being positively locked through further rotation of the clutch ring 10a. This automatically returns the spring-loaded brake cylinder to the braking position.

Figure 3:
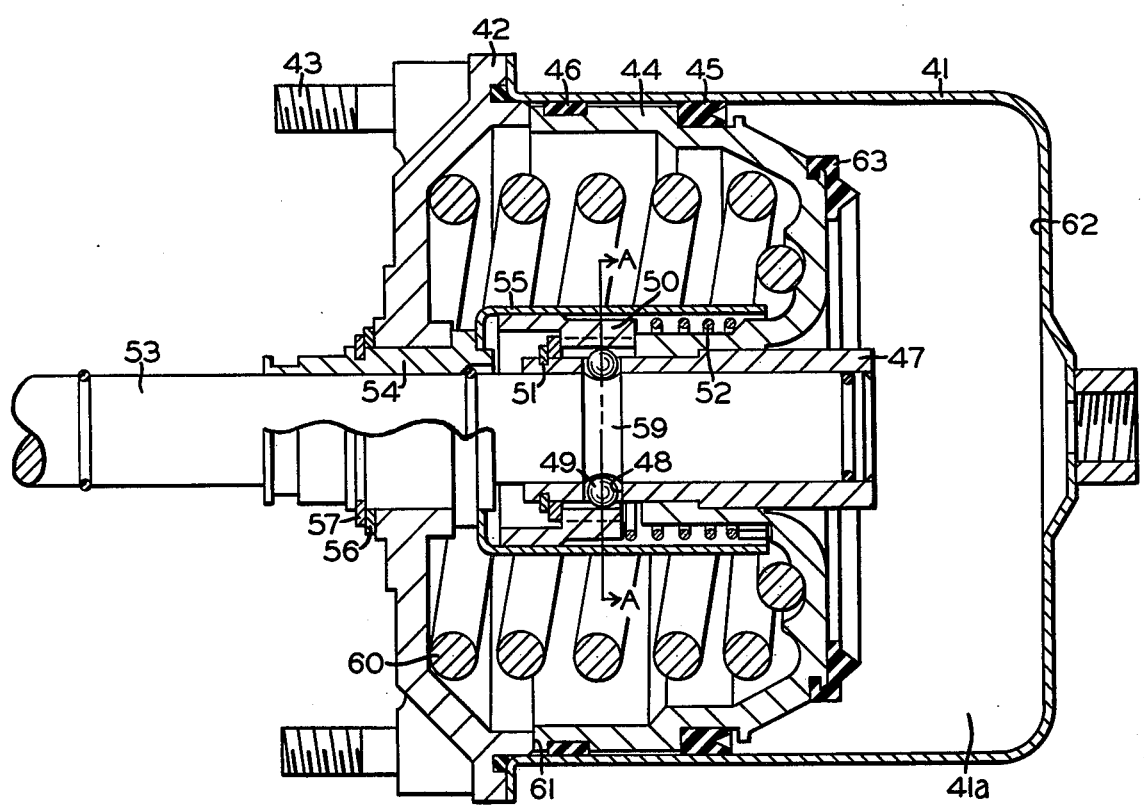
FIG. 3 is an elevational view, in section, of still a further modification of the spring-loaded brake cylinder with a quick-release device shown in FIG. 2.
Figure 3A:
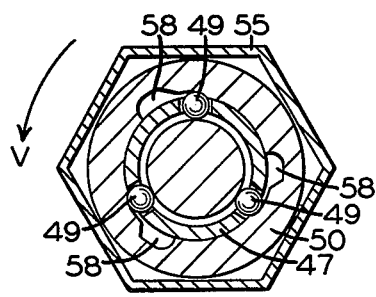
FIG. 3A is a sectional view taken along line A—A of FIG. 3.

The spring-loaded brake cylinder shown in FIG. 3 is a pull type and comprises a cylinder 41 which has a flange 42 secured thereto with bolts 43. Installed in the cylinder 41 is a piston 44 with a sealing ring 45, a guide ring 46, a bushing 47 having bores 48, steel balls 49, a clutch ring 50, a retaining ring 51, a torsion spring 52 and a piston rod 53. A rotary bushing 54 with a key face is located in flange 42. Bushing 54 is furthermore fixed to a cup-shaped coupling member 55 and secured against axial displacement by means of a disc 56 and a retaining ring 57 in flange 42. Coupling member 55 is cup-shaped with an exterior hexagonal shape and complementarily receives a hexagonally-shaped portion of clutch ring 50. In addition to this, specially formed spaces or recesses 58 are formed in clutch ring 50 along with an annular tee-slot 59 in the piston rod 53. A compression spring 60, serving as an energy storage member, is compressibly disposed between the inner face of piston 44 and bottom member 42. When the brake is in a release disposition, piston 44, as a result of pressure supplied to a chamber 41a, assumes a brake-releasing position, in which it is shown in FIG. 3, in abutting contact against a stop 61 comprising an annular shoulder formed by flange 42. The force of spring 60 is transferred to the piston rod 53 via piston 44, bushing 47, clutch ring 50, and annular tee-slot 59. The brakes may be manually released by rotation of bushing 54 in a direction opposite to that of arrow V, whereby, via coupling 55, clutch ring 50 is taken along against the initially tensioned spring 52 until the steel balls 49, as a result of the forces acting upon them, drop into spaces 58. As a result, the flux of force from spring 60 to piston 44 to piston rod 53 is interrupted, and the brake released. The piston rod 53 is rendered powerless and the piston 44 together with the clutch ring 50 and the balls 49, without piston rod 53, moves until a stop or end wall 62 of said cylinder is contacted by an adjacent end 63 of piston 44. If it is desired to reset the brakes, chamber 41a is recharged, so that piston 44 is subjected to such pressure and thus returned to its brake release position in contact with stop 61. When the steel balls 49 on the piston rod 53 are in place above the annular tee-slot 59, the clutch ring 50, as a result of rotation through the torsion spring 52, pushes the steel balls 49 across the slants of the spaces 58 back into the original locked position. At the same time, the steel balls 49 become positively locked through further rotation of the clutch ring 50. This automatically returns the spring-loaded brake cylinder to the braking position.

In another version of the invention, the piston 4 or 44, respectively, may be replaced by a diaphragm-type piston.

Having thus described the invention, what we claim as new and desire to secure by Letters patent, is:

1. A mechanical quick-release mechanism for spring-loaded brake cylinders comprising:
 (a) a cylinder housing having a pressure chamber;

(b) a piston operably disposed in said housing;

(c) a piston rod connected with said piston;

(d) a compression spring acting on said piston and effective, when compressed by pressure acting in said chamber and on said piston, for effecting operation of said piston and piston rod to a brake-releasing position, said spring being effective, upon reduction of pressure from said chamber, for operating said piston and piston rod to a brake application position;

(e) a self-locking clutch connection between the piston and the piston rod including a plurality of balls lockingly disposed in an annular groove formed on a portion of the outer diameter of the piston rod;

(f) a rotatable clutch element partially surrounding said piston rod having recesses for receiving the balls when the clutch is released;

(g) a rotatable shaft having one end extending exteriorly of said housing and the other end extending into the piston rod; and (h) a coupling element axially-movable on the rotatable shaft and being rotatable therewith for transmitting the rotary movement of the shaft to the clutch element, said coupling element extending circumferentially radially outward to engage said clutch element such that, upon rotation of said shaft, said clutch element is rotated to a position wherein said plurality of balls are moved outward into said clutch recesses.

2. A mechanical quick-release mechanism, according to claim 1, wherein:

the torsional and axial movement between the rotatable shaft and the coupling element is effected by complementarily engaging hexagonal surfaces therebetween.

3. A mechanical quick-release mechanism, according to claim 1, further characterized by a torsion spring torsionally connecting said self-locking clutch connection and said coupling element so that the tension thereof counteracts the uncoupling motion of the ball locking mechanism.

4. A mechanical quick-release mechanism, according to claim 1, further characterized by a bushing coaxially disposed on the outer diameter of the piston rod and has holes formed therein for holding the balls and for providing protection therefor during movement in the axial direction.

5. A mechanical quick release mechanism as set forth in claim 1, further comprising a bias spring disposed adjacent said coupling element and urging said coupling element toward said clutch element to maintain the relative axial positions of said coupling element and said clutch element, respectively, as said clutch element moves axially with said piston during a brake application.

6. A mechanical quick-release mechanism for spring-loaded brake cylinders comprising:

(a) a cylinder housing having a pressure chamber;

(b) a piston operably disposed in said housing;

(c) a piston rod movable with said piston and having an annular groove formed on a portion of the outer diameter;

(d) a compression spring acting on said piston and effective, when compressed by pressure acting in said chamber and on said piston, for operating said piston and piston rod to a brake-releasing position, said spring being effective, upon reduction of pressure in said chamber, for operating said piston and piston rod to a brake-applying position;

(e) a self-locking clutch connection between said piston and said piston rod including a plurality of balls and a bushing connected to said piston and surrounding a portion of said piston rod and, further, said bushing being axially movable with said piston, said bushing having a plurality of through bores through which said plurality of balls seat to contact said annular groove on said piston rod to effect said clutch connection;

(f) a rotatable clutch element partially surrounding and axially movable with said bushing having recesses for receiving said plurality of balls when said clutch connection is released; and (g) clutch-rotating means cooperatively engaging said clutch element for rotating said clutch element such that said clutch recesses align with said bushing through bores whereby said plurality of balls move outward into said clutch recesses, said clutch rotating means including a shaft means having a stub portion projecting exteriorly of said housing and a coupling element secured to a portion of said shaft member disposed within said cylinder, said coupling element extending circumferentially radially outward to engage said clutch element.

7. A mechanical quick-release mechanism, as set forth in claim 6, wherein said clutch-rotating means further includes a hexagonal engaging portion for transmitting rotational movement to said clutch element.

* * * * *

UNITED STATES PATENT OFFICE
CERTIFICATE OF CORRECTION

PATENT NO. : 4,480,531
DATED : November 6, 1984
INVENTOR(S) : Horst Mylius et al It is certified that error appears in the above-identified patent and that said Letters Patent are hereby corrected as shown below:

Column 6, line 39, delete "means", second occurrence, and insert --member--

Signed and Sealed this

Sixteenth Day of April 1985

[SEAL]

Attest:

DONALD J. QUIGG

Attesting Officer     Acting Commissioner of Patents and Trademarks